March 20, 1956    J. M. WALLACE    2,739,269
PROTECTIVE DEVICES
Filed Oct. 13, 1951

WITNESSES:

INVENTOR
James M. Wallace.
BY
ATTORNEY

United States Patent Office 2,739,269
Patented Mar. 20, 1956

2,739,269

PROTECTIVE DEVICES

James M. Wallace, Pittsburgh, Pa., assignor to Westinghouse Electric Corporation, East Pittsburgh, Pa., a corporation of Pennsylvania Application October 13, 1951, Serial No. 251,231

13 Claims. (Cl. 317—18)

My invention relates to protective devices for electric circuits, and it has reference in particular to such devices as may be used with an automatic reclosing circuit breaker for ensuring sufficient current to operate the breaker in the event of a fault.

Generally stated, it is an object of my invention to provide in a new and novel manner for applying a sufficient current to an automatic reclosing circuit breaker to ensure operation thereof, in the event of a fault.

Another object of my invention is to provide for momentarily interrupting a circuit to draw an arc, and for grounding the circuit through the arc so as to provide sufficient current for operating an automatic reclosing circuit breaker connected in circuit relation therewith.

Yet another object of my invention is to provide in a distribution system for interrupting the circuit in the event of a fault, and drawing an arc which is then transferred to a ground electrode for establishing a current of sufficient value to open a reclosing circuit breaker.

It is also an object of my invention to provide in a protective device for an electric circuit, for utilizing electroresponsive means for interrupting the circuit in the event of a fault so as to draw an arc, and then grounding the circuit through the arc so as to produce a current flow sufficient to effect operation of a circuit breaker connected between the protective device and the source.

It is an important object of my invention to provide for increasing the current through a circuit breaker under a fault condition by drawing an arc at a predetermined point in the circuit in response to a current in excess of a predetermined normal value, and then grounding the circuit through the arc.

Other objects will in part be obvious, and will in part be explained hereinafter.

For a more complete understanding of the nature and scope of my invention, reference may be made to the following detailed description of a preferred form of the invention, which may be read in connection with the accompanying drawing, in which.

Figure 1:
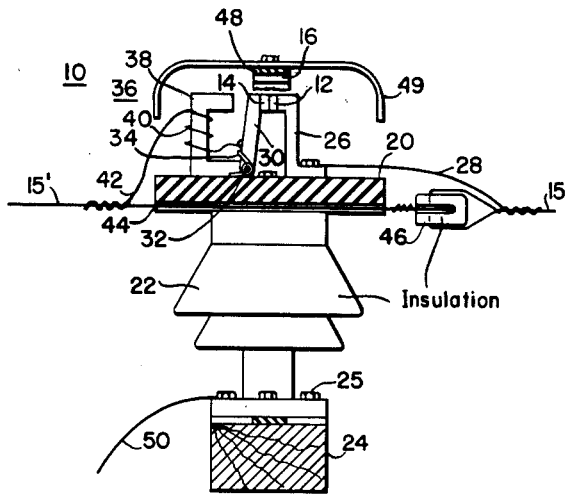
Figure 1 is a front elevational view, partly in section, of a protective device embodying the invention in one of its forms.
Figure 2:
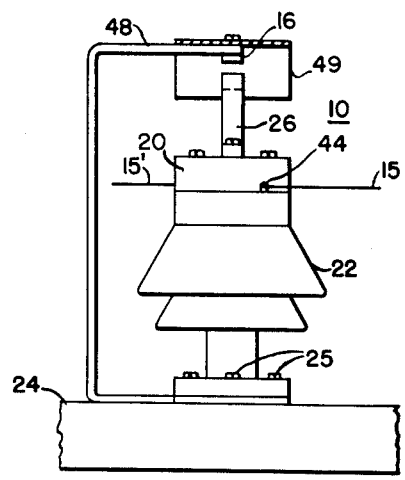
Fig. 2 is a side elevation view of the protective device shown in Fig. 1 partly in section.

Referring particularly to Figs. 1 and 2, the reference numeral 10 may denote generally a protective device for a distribution circuit, comprising separable contacts 12 and 14 which may be connected in circuit relation with adjacent sections 15 and 15' of the distribution circuit in conjunction with a grounded electrode 16, which is disposed adjacent the separable contacts for grounding the distribution circuit through an arc disposed to be drawn between the contacts 12 and 14, for the purpose of ensuring a sufficient flow of current in the distribution circuit to operate a circuit breaker or the like.

The separable contacts 12 and 14 may be mounted on an insulating block 20 of porcelain, phenolic resin or the like, which may be supported by means of an insulator 22 of the usual type, secured to a cross arm 24 by means of bolts 25 through the base of the insulator. The contact 12 may be stationary being, for example, secured to the insulating block 20 by means of an upright support 26, which may be electrically connected by means of a terminal connection or jumper 28 to the section 15 of the distribution circuit, on the source side of the circuit. The contact 14 may be movable relative to the contact 12 being, for example, mounted on a support 30 which may be pivotally mounted on the insulating block 20 as by a pivot 32. Means, such as the spring 34, may be provided for normally biasing the support 30 towards the support 26 so as to maintain the contacts 12 and 14 in engagement.

In order to provide for effecting separation of the contacts 12 and 14, the support 30 may comprise an armature of magnetic material being, for example, formed from a plurality of iron laminations. Electro responsive means 36 may be provided for actuating the magnetic support member 30 to separate the contact member 14 from the contact member 12. Such electro-responsive means may comprise, for example, a substantial U-shaped magnetic core member 38 tipped on its side and having the magnetic support member 30 pivotally mounted on the lower leg thereof by means of the pivot 32. The core member 38 may be provided with an operating winding 40 which may comprise several turns of a conductor 42 providing a terminal connection by which the contact member 14 may be electrically connected through the magnetic support member 30 to the load section 15' of the distribution circuit. The insulating block 20 may be provided with a groove or recess 44 on the lower side for receiving the conductor section 15', which may be mechanically connected to the conductor section 15 but electrically insulated therefrom, by means of a strain insulator 46.

The grounded electrode 16 may be supported in spaced relation to the separable contacts 12 and 14 being, for example, disposed above the contacts 12 and 14 so as to be in or immediately adjacent the path of an arc drawn between them as it rises. The grounded electrode 16 may be thus supported by means of a U-shaped bracket 48 which may be secured to the cross arm 24 beneath the base of the insulator 22. An arcuate sleet shield 49 may be secured to the bracket 48 to protect the contacts and electro-responsive means. A ground wire 50 may be connected to the bracket 48 at the base of the insulator for grounding it in a manner well known in the art.

Figure 3:
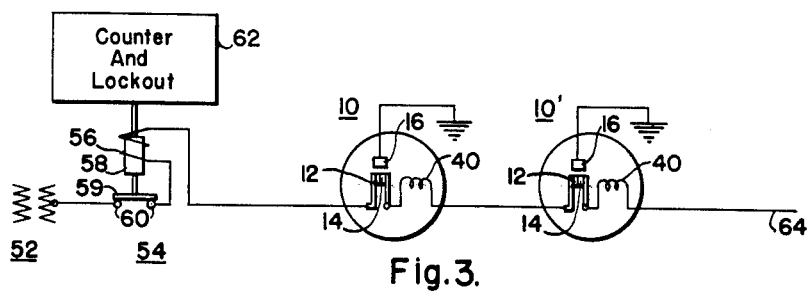
Fig. 3 is a diagrammatic view of a distribution circuit illustrating an application of the invention.

Referring to Fig. 3, it will be seen that two of the protective devices 10 and 10' may be connected in series circuit relation with each other, with a reclosing circuit breaker 54 connected between them and a distribution transformer 52, which operates as a source of electrical energy for the distribution circuit. The reclosing circuit breaker may be of any type well known in the art, such as for example, the type which is described in detail in copending patent application Serial No. 719,524 of James M. Wallace et al., entitled Circuit Interrupters, which was filed on December 31, 1946, and is assigned to the assignee of the present invention, and is now Patent No. 2,626,329. As herein shown schematically, the reclosing circuit breaker comprises a series operating winding 56 for actuating an armature 58 to separate separable contacts 59 and 60 in response to a current of greater than a predetermined value. The circuit breaker is provided with counting means 62 for operating the operating mechanism of the circuit breaker after a predetermined number of openings, say four, so as to lock the circuit breaker in the open position.

With the protective devices 10 and 10' connected in the distribution circuit following the reclosing circuit breaker 54, a fault at the point 64, which may produce in itself insufficient current to operate the reclosing circuit breaker, produces a sufficient flow of current through the operating winding 40 of the protective device 10' to separate the contact 14 from the contact 12, thereby drawing an arc. This arc rises due to the heat of the arc, and immedaitely flashes over to the grounded electrode 16, thereby grounding the distribution circuit at this point, and providing a relatively low impedance ground which is in shunt with the winding 40, since the winding 40 will itself be connected to ground through different ones of the load devices on the sections of the circuit more remote from the circuit breaker 54. The flow of fault current through the operating winding 40 will immediately be reduced as a result of the reduction in voltage due to grounding of the distribution line so that the armature 30 is released, and the contacts 12 and 14 reengage.

The protective device 10, while it may have a higher rating than the protective device 10', and may therefore not be operated initially in response to the fault at the point 64, will now be operated as a result of the increased current due to grounding of the circuit by the protective device 10'. Accordingly, the contacts 12 and 14 of the protective device 10 will separate drawing an arc which transfers to the grounded electrode 16, thus grounding the circuit at the protective device 10. This further increases the fault current due to the reduced impedance of the circuit from the source to the point of the grounding. The current through the operating winding 56 of the reclosing circuit breaker 54 will now be sufficient to effect operation of the circuit breaker. The contacts 59 and 60 will therefore be separated in the usual manner, deenergizing the distribution circuit. After the usual time interval, the contacts 59 and 60 are reclosed. If this interruption of the circuit is sufficient to remove the fault, the circuit breaker remains closed and service will be restored. If, however, the fault still continues at the point 64, the protective devices 10 and 10' will again operate in cascade, thus causing repeated opening of the circuit breaker 54 until it locks open in the usual manner.

By utilizing protective devices embodying the features of my invention, the tripping range of a reclosing circuit breaker may be greatly extended. A protective device embodying the features of my invention provides for quickly and effectively grounding the circuit through an arc, thereby providing a simple and efficient switching medium for grounding the circuit.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. In an electric circuit protective device, separable contacts, means including an electromagnetic device connected in series with said contacts on a side thereof remote from a source operable to effect separation of said contacts in response to a current above a predetermined value, means for reclosing said contacts following a separation, and contact means disposed in spaced relation with said contacts in the path of an arc drawn between said contacts for providing a relatively low impedance path in shunt with said electromagnetic device for an arc current.

2. A circuit protector comprising, separable contacts, means biasing said contacts together, operating means for said contacts including electro-responsive means for connection in series with a circuit operable to effect only a momentary separation of said contacts in response to a current above a predetermined value, and contact means disposed in such spaced relation with said contacts as to be in the path of an arc drawn between said contacts to provide a low impedance transfer path in shunt with the electroresponsive means for an arc drawn between said contacts.

3. In a protective device for an electric circuit connected to a source, an insulating support, separable contacts connected between the source and the circuit mounted on said support, operating means for said contacts including electromagnetic means connected on the circuit side of the contacts operable in response to a current of a predetermined value in said circuit to effect separation of said contacts to interrupt the circuit, additional ground contact means mounted in close proximity to said contacts and immediately above said contacts so as to be contacted by an arc drawn therebetween for grounding an arc drawn between the separable contacts in shunt with the electromagnetic means.

4. A protective device for an electric circuit comprising, an insulating support, separable contacts mounted on said support for connection in said circuit, means biasing said contacts together, means including electroresponsive means having an operating winding connected in series circuit relation with said contacts for effecting separation thereof in response to a current of a predetermined value in the circuit, a fixed contact disposed above and in sufficiently close proximity to the fixed one of the separable contacts so as to be contacted by an arc drawn between the contacts, and circuit means connected to said fixed contact and ground for grounding an arc drawn between the separable contacts.

5. The combination with a circuit breaker having separable contacts and electroresponsive means for effecting separation thereof in response to a fault current, of a protective device having separable contacts normally biased into engagement with each other and disposed to be connected in circuit relation with the contacts of the circuit breaker, operating means for said contacts including electroresponsive means connected on the side of the protective device contacts remote from the circuit breaker responsive to a fault current less than that required to operate the contacts of the breaker, and a fixed ground electrode means disposed above and in spaced relation with the contacts of the protective device so as to be contacted by an arc drawn therebetween to ground one of said contacts by means of an arc and apply a definite fault to the circuit breaker.

6. In combination, a reclosing circuit breaker having separable contacts and electroresponsive means for effecting separation thereof in response to a fault current, and a protective device having separable contacts disposed to be connected between the breaker and a load circuit, means biasing the contacts of the protective device closed, means including electromagnetic means connected in series with the protective device contacts on the side thereof remote from the breaker, said electromagnetic means being operable in response to a fault current less than that required to operate the electroresponsive means of the breaker for effecting separation of the contacts of the protective device, and grounded electrode means disposed above and in such spaced relation with the contacts of the protective device as to be engaged by an arc drawn therebetween for grounding the breaker through an arc drawn between the contacts of the protective device, so as to produce an arc fault current sufficient to effect operation of the electroresponsive means of the breaker.

7. In combination, a reclosing circuit breaker having separable contacts with electroresponsive means for effecting separation thereof in response to a current of a predetermined value; and a protective device for connection in series with the breaker having an insulating support with a pair of separable contacts thereon, operating means for said contacts including electroresponsive means including an operating winding carried by the insulating support and connected in series with and on the side of the pair of contacts remote from the circuit breaker for separating the contacts of the protective device to draw an arc, means biasing the contacts of the protective device to reclose, and a grounded electrode disposed in spaced relation with the contacts but in the path of an arc drawn between said contacts of the protective device for grounding said arc to draw sufficient current to effect operation of the reclosing breaker.

8. A protective device comprising, an insulating support having a passage for receiving an electric conductor, separable contacts mounted on said support, means including electroresponsive means on said support including a winding disposed to be connected in circuit with said conductor and operable in response to a current above a predetermined value to effect separation of said contacts to draw an arc therebetween, means automatically reclosing said contacts after separation, a fixed ground electrode disposed sufficiently adjacent said contacts to be contacted by an arc drawn therebetween for grounding said arc in parallel with the electroresponsive means, and a sleet shield mounted on said electrode extending over said contacts and electroresponsive means.

9. In a protective device, an insulating support having a base, separable contacts mounted on said support, means biasing said contacts closed, means including electroresponsive means carried by said support operable in response to a current above a predetermined value to move one of said contacts for drawing an arc therebetween, a ground electrode, and a fixed support for the ground electrode disposed to secure said electrode above said contacts and sufficiently close to be contacted by an arc drawn therebetween, for grounding said arc and deenergizing said electroresponsive means.

10. In a protective device for an electric circuit having a load connected to a source, separable contacts disposed to be connected in the circuit, said contacts being biased together, operating means for said contacts including electromagnetic means having a solenoid for connection in series with the circuit on the load side of the contacts operable to effect separation of said contacts in response to a current greater than a predetermined value in said circuit, and additional contact means connected to ground disposed in predetermined spaced relation with said separable contact means so as to be contacted by an arc drawn therebetween to ground an arc drawn between said separable contact means.

11. A protective device for connecting an electric circuit to a source comprising, a source terminal for connection to the source, a load terminal for connection to the electric circuit, means including separable contacts normally biased to connect said terminals, operating means for said contacts including electroresponsive means connected between the contacts and the load terminal having an armature operable to effect separation of said contacts in response to a current of a predetermined value in said circuit, and fixed contact means connected to ground and disposed in such spaced relation with said contacts as to be in the path of an arc drawn between said separable contacts for grounding an arc drawn between said separable contacts.

12. In a protective device for an electric load circuit, an insulating support, separable contacts on said support disposed to be normally connected between said load circuit and a source, means including electromagnetic means having an operating winding connected in series circuit relation with said contacts on the load circuit side thereof for effecting separation thereof in response to a current of greater than a predetermined value in said circuit, means automatically reclosing said contacts following a separation, and a ground contact disposed above and in such spaced relation with the fixed one of said separable contacts as to be in the path of an arc drawn between the contacts for making a connection with at least one of said separable contacts through an arc drawn between them.

13. The combination with an automatic reclosing circuit breaker having separable contacts with electro-responsive means connected in circuit relation therewith for effecting separation of said contacts in response to a fault current of a predetermined value; of a protective device having separable contact means connected in circuit relation with the contacts of the breaker, means biasing the contact means of the protective device closed, operating means for said contact means including electromagnetic means connected in the circuit on the side of the protective device contact means remote from the circuit breaker for effecting separation of the contact means of the protective device at a value of fault current below that required to effect operation of the electroresponsive means of the breaker, and grounding means comprising a grounded electrode disposed in spaced relation with the contact means of the protective device just outside the arc of travel of the movable one of said contact means but in the path of an arc drawn between them for grounding the breaker through a portion of said arc to produce a fault current sufficient to effect operation of the electroresponsive means of the breaker.

References Cited in the file of this patent

UNITED STATES PATENTS

| Re. 22,872 | Matthews | Apr. 29, 1947 |
| 656,680 | Thomson | Aug. 28, 1900 |
| 1,822,112 | Schofield | Sept. 8, 1931 |
| 2,349,609 | Brown et al. | May 28, 1944 |
| 2,383,327 | Ludwig | Aug. 21, 1945 |
| 2,462,212 | Mosley | Feb. 22, 1949 |
| 2,502,179 | Smith | Mar. 28, 1950 |
| 2,545,660 | Graybill | Mar. 20, 1951 |
| 2,572,637 | Lincks | Oct. 23, 1951 |

FOREIGN PATENTS

| 230,503 | Great Britain | June 10, 1926 |
| 475,130 | Great Britain | Nov. 15, 1937 |
| 623,438 | Germany | Dec. 20, 1935 |

OTHER REFERENCES

Cramer, Abstract Ser. No. 65,705, published January 31, 1950.